United States Patent
Robbins et al.

[11] Patent Number: 4,920,566
[45] Date of Patent: Apr. 24, 1990

[54] DUAL LOOP SINEWAVE DESCRAMBLER AND METHOD OF DESCRAMBLING

[75] Inventors: Clyde Robbins, Maple Glen; Daniel Marz, Dresher, both of Pa.

[73] Assignee: General Instrument Corporation, New York, N.Y.

[21] Appl. No.: 305,434

[22] Filed: Feb. 1, 1989

[51] Int. Cl.⁵ .............................................. H04N 7/167
[52] U.S. Cl. ......................................... 380/19; 380/10
[58] Field of Search ................................. 380/7, 10, 19

[56] References Cited

U.S. PATENT DOCUMENTS

| | | | |
|---|---|---|---|
| 4,024,575 | 5/1977 | Harney et al. | 380/7 |
| 4,112,464 | 9/1978 | Guif et al. | 358/122 |
| 4,148,064 | 4/1979 | Reed | 380/7 |
| 4,571,615 | 2/1986 | Robbins et al. | 358/120 |
| 4,598,318 | 7/1986 | Robbins | 358/124 |

Primary Examiner—Stephen C. Buczinski
Assistant Examiner—Bernarr Earl Gregory
Attorney, Agent, or Firm—Barry R. Lipsitz

[57] ABSTRACT

A method and apparatus are provided for descrambling a sinewave scrambled television signal. The television signal is applied to a dual loop circuit that detects AM sinewave modulation on the television signal sound carrier. The detected modulation is applied to the picture carrier of the television signal in a first loop of the circuit to cancel the AM sinewave modulation therefrom. The detected modulation is applied to the sound carrier of the television signal in a second loop of the circuit to increase the AM sinewave modulation on the sound carrier within the loop. The net loop gain of the first loop is then lowered to minimize the application of noise from the sound carrier to the picture carrier.

4 Claims, 1 Drawing Sheet

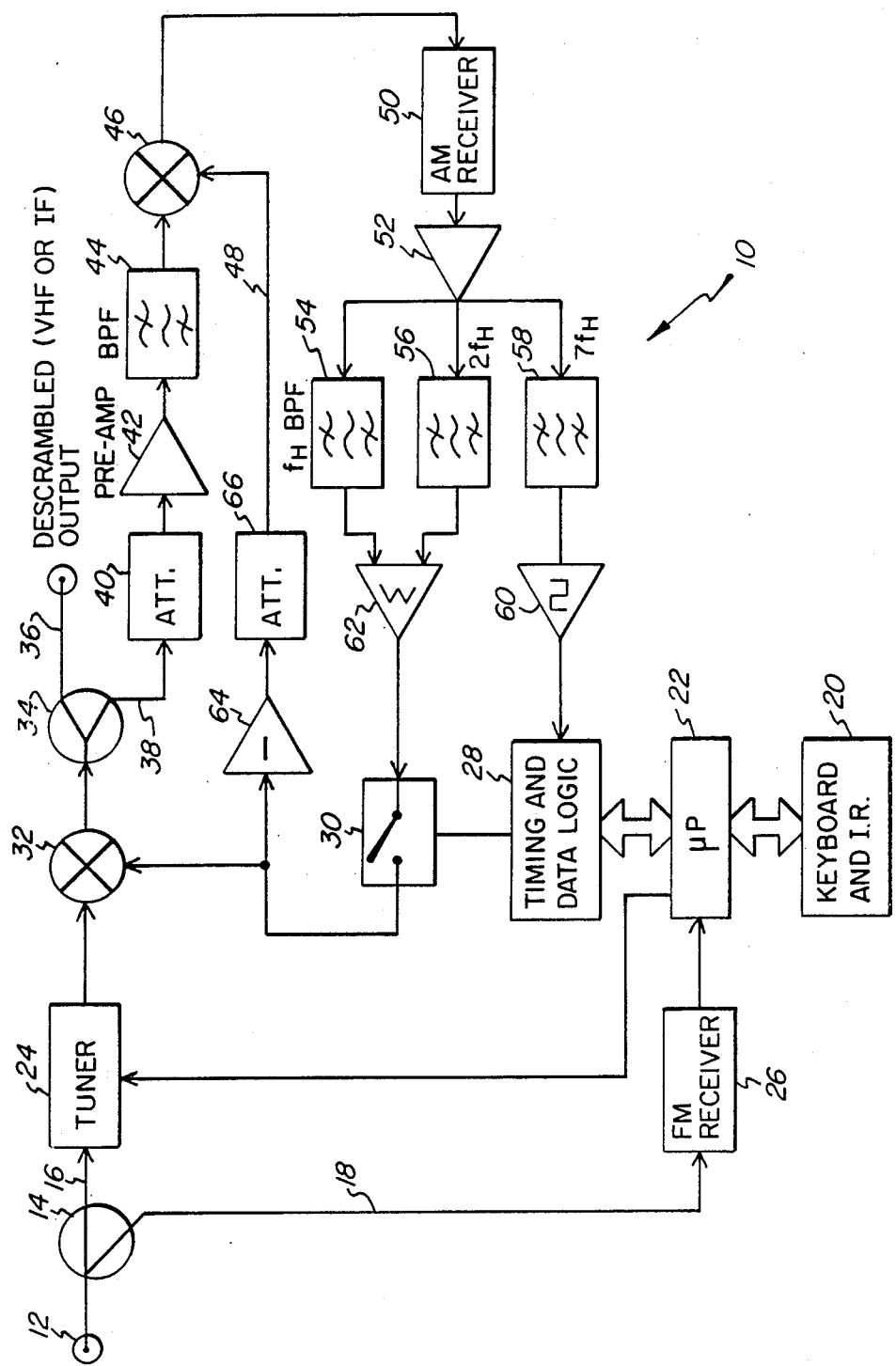

DUAL LOOP SINEWAVE DESCRAMBLER AND METHOD OF DESCRAMBLING

TECHNICAL FIELD OF THE INVENTION

The invention relates to television (TV) signal transmission, and reception, especially to providing such transmission over a cable network with the video portion of the television signal scrambled, and descrambling the scrambled signal at the receiving end.

BACKGROUND OF THE INVENTION

It is desirable to provide a level of security in cable television transmissions so that the video (picture) and/or audio (sound) portions of a TV transmission may only be viewed and/or heard on a premium basis by subscribers who have paid a special fee (premium) therefor.

Techniques for scrambling the video portion of a television signal are generally well known. For instance, U.S. Pat. No. 4,024,575, entitled CATV SINE WAVE CODING SYSTEM and U.S. Pat. No. 4,112,464, entitled SUBSCRIPTION TV DECODER LOGIC SYSTEM disclose a scrambling format described wherein the video sync intervals are suppressed using a sinewave attenuation timing signal (sinewave scrambling signal). The sync is recovered by applying a reverse sinewave timing signal which is derived from the amplitude modulation on the FM sound carrier. The modulation of the sound carrier is normally 0.5 dB greater than that of the picture carrier.

Typical signal levels for the sinewave scrambling signal are 6.5 dB on the picture carrier and 7 dB on the sound carrier.

Commonly-owned U.S. Pat. Nos. 4,598,318 and 4,571,615 describe various techniques for scrambling television transmissions, and descrambling the transmissions at the subscriber (receiving) end of the network.

In other prior art sinewave descramblers, a feedback AGC loop detects the AM sinewave modulation on the sound carrier and applies it to attenuate the sinewave scrambling signal audio and video in a closed loop manner until about 0.5 dB of sinewave scrambling signal remains on the audio carrier. At that point, the sinewave scrambling signal on the picture carrier will be completely cancelled.

In all of the above techniques for descrambling, there is a tendency for noise from the sound carrier to find its way onto, and adversely affect the quality of, the picture carrier. This is especially noticeable, such as in streaking of the picture, when there is a poor carrier-to-noise ratio, such as on the order of 35 to 40 dB.

DISCLOSURE OF THE INVENTION

It is an object of the invention to provide an improved sinewave sync suppression technique that results in less noise from the sound carrier finding its way onto the picture carrier.

According to the invention a two-stage (dual loop) AGC circuit is employed to detect the AM sinewave modulation (scrambling signal) on the sound carrier for application to the picture carrier. The first stage cancels AM modulation on the picture carrier. The second stage is employed to put back more AM sinewave modulation on the sound carrier so that the net loop gain of the first stage can be made lower. The result is that 1.5 to 2.0 dB (rather than 0.5 dB) of AM sinewave modulation is left on the sound carrier when the sinewave scrambling signal on the picture carrier is completely cancelled.

A lower loop gain in the first stage results in less noise from the sound carrier being applied to the picture carrier. Lower loop gain also makes alignment for low residual easier.

A difference between the present invention and the prior art techniques of descrambling is that in the prior art, a high loop gain is employed to remove (cancel) the AM sinewave modulation (scrambling signal) from both the picture and sound carriers. Such a high loop gain results in noise on the video portion of the TV signal. In the present invention, the net loop gain is kept low. The AM sinewave modulation is cancelled from the picture carrier, but is left on the sound carrier, resulting in less noise on the video portion of the TV signal.

Other objects, features and advantages of the invention will become apparent in light of the following description thereof.

BRIEF DESCRIPTION OF THE DRAWINGS

The FIGURE is a schematic block diagram of the dual loop sinewave descrambler of the present invention.

The following commonly-used abbreviations (in parentheses) may be used throughout this application, including the drawings: alternating current (AC); adaptive delta modulation (ADM); audio frequency (AF); automatic gain control (AGC); amplitude modulation (AM); amplifier (AMP); bandpass filter (BPF); Broadcast Television Standards Committee (BTSC); cable television (CATV); decibel (dB); direct current (DC); Federal Communications Commission (FCC); frequency division multiplexing (FDM); horizontal frequency ($f_H$); frequency modulation (FM); intermediate frequency (IF); gain (K); kilohertz (KHz); megahertz (MHz); microprocessor ($\mu$P); modulator (MOD); National Television Standards Committee (NTSC); pulse amplitude modulation (PAM); pulse code modulation (PCM); pulse modulation (PM); pulse width modulation (PWM); quadrature phase shift keying (QPSK); radio frequency (RF); surface acoustic wave (SAW); time division multiplex (TDM); television (TV); and very high frequency (VHF).

DETAILED DESCRIPTION OF THE INVENTION

The FIGURE shows the dual loop sinewave descrambler 10 of the present invention. Generally, there are two AGC loops involved, in other words, a two-stage, dual loop AGC circuit. The first loop (stage) is basically the same as prior art systems using negative feedback with AM sinewave modulation on the sound carrier cancelling AM sinewave modulation on both the picture and sound carriers. The second loop is used to put AM sinewave modulation back onto only the sound carrier in order that the net loop gain can be lower. Approximately 2 dB of AM sinewave modulation is left on the sound carrier when the sinewave scrambling signal on the picture is cancelled, rather than 0.5 dB as is typical in prior art systems. This net effect of decreasing the gain lowers the applied noise and positive feedback inherent in prior art approaches.

A cable input 12 receives scrambled and unscrambled TV signals over the cable TV transmission line (not shown). The signals are split by a splitter 14 onto two signal paths 16 and 18. As mentioned hereinbefore, scrambling is accomplished by suppressing the video sync intervals using a sinewave attenuation timing (scrambling) signal in a manner that is well known in the art to which this invention pertains.

Channel selection is effected by a keyboard or infrared remote sensor 20 and a microprocessor (μP) 22 which exercises control over a tuner 24, all in a manner well known in the art to which this invention pertains. Premium channel service is effected by a signal received by an FM receiver 26, out of band, containing encoded information as to which channels should be descrambled. These codes are passed on to the microprocessor 22, again in a manner well known in the art to which this invention pertains. For premium channels, the microprocessor 22 outputs timing and data logic signals to a timing and data circuit 28, and also effects the closure of a switch 30 for descrambling premium channels, again in a manner well known in the art to which this invention pertains.

The output of the tuner 24 is provided to a modulator 32, which also receives as an input a descrambling signal via the switch 30, which descrambling signals will be described in greater detail hereinafter. The output of the modulator 32 is provided to a splitter 34, and split onto two signal paths 36 and 38. On one signal path 36, the descrambled (if received scrambled) output of the descrambler 10 is provided at either VHF or at an intermediate frequency (IF), depending upon the characteristics of downstream receiving equipment, for reception by the viewer.

A portion of the received signal, on the path 38, is provided to an attenuator 40 to provide isolation, and is then amplified by a pre-amplifier 42 prior to being provided to a sound bandpass filter (BPF) 44, which may be a surface acoustic wave (SAW) device. The output of the BPF 44, which is the sound carrier portion of the TV signal, is provided to a modulator 46, which receives as another input a signal on a line 48, which is described hereinafter. The output of the modulator 46 is provided to an AM receiver 50, for demodulation. The output of the AM receiver 50 is amplified by an amplifier 52 and provided to three bandpass filters 54, 56 and 58. One bandpass filter 54 operates at $f_H$, another bandpass filter operates at $2f_H$, and another bandpass filter operates at $7f_H$.

The output of bandpass filter 58, at $7f_H$, contains in-band toggling data indicative of authorization to descramble, and is provided to a comparator 60, which slices the channel tag data (in-band toggling data). The output of the amplifier 60 is provided to the timing and data logic circuitry 28 to authorize decoding of authorized programs.

The outputs of the bandpass filters 54 and 56, at $f_H$ and $2f_H$ respectively, are provided to a summing amplifier 62, the output of which is the descramble (descrambling) wave. As mentioned hereinbefore, when a scrambled signal is received, and the proper authorization codes are received for the premium channel, the switch 30 closes, which provides the output of the summing amplifier 62 to the modulator 32, to effect descrambling, at the modulator 32, by cancelling the AM modulation on the video portion of the TV signal.

The output of the summing amplifier 62 is also provided (when the switch 30 is closed) to an inverting (phase shifting) amplifier 64, the output of which is attenuated by an attenuator 66 and passed on to the modulator 46 to keep 1.5 to 2.0 dB of sinewave modulation on the sound carrier.

Basically, descrambling is accomplished by detecting the AM sinewave modulation at $f_H$ (Horizontal Frequency) or at $2f_H$ from the sound carrier and modulating both the picture and the sound carriers in the modulator 32 180° out of phase with the original sinewave scrambling signal. This forms a negative feedback loop. Typically the AM sinewave modulation on the sound carrier is 0.5 dB larger than that applied to the picture carrier in the scrambler. Complete cancellation of the picture carrier sinewave scrambling signal will occur when 0.5 dB remains on the sound carrier. It is desirable to reduce the loop gain and thereby reduce the noise applied to the picture carrier. In order to reduce the required gain, the modulator 46 is used with the attenuated sinewave in phase with the original scrambler. Modulator 46 puts AM sinewave modulation back on the sound carrier only. The attenuation is such that complete cancellation of the picture carrier sinewave scrambling signal occurs when 1.5 to 2.0 dB remain on the sound carrier. The required descrambler gain is now reduced so that the noise from the sound carrier is amplified to a lower level than is present if only the modulator 32 were used.

In terms of a two-stage, or dual loop sinewave descrambler the first loop (stage) is defined by the elements 32, 34, 40, 42, 44, 46, 50, 52, 54, 56, 62, 30 and 32; and the second loop (stage) is defined by the elements 64, 66, 46, 50, 52, 54, 56, 62, 30 and 64. In essence, the second loop is a loop within the first loop. The elements 64, 66 and line 48 are unique to the second loop.

What is claimed is:

1. A method of descrambling a television signal, the video portion of which has been scrambled by a sinewave scrambling signal which is also impressed on the audio portion of the television signal, said method comprising:

receiving a scrambled television signal, said scrambled television signal having a picture carrier and a sound carrier, both of which carriers have AM sinewave modulation for effecting scrambling of the television signal;

applying the received television signal to a dual loop circuit to detect the AM sinewave modulation on the sound carrier;

applying the detected AM sinewave modulation to the picture carrier in a first loop of said circuit to cancel the AM sinewave modulation on the picture carrier; and applying the detected AM sinewave modulation to the sound carrier in a second loop of said circuit to increase the AM sinewave modulation on the sound carrier.

2. A method according to claim 1, comprising the further steps of:

providing a first gain in said first loop and a second gain in said second loop; and adjusting said first and second gains to leave 1.5 to 2.0 dB of AM sinewave modulation on the sound carrier within the second loop when the sinewave on the picture carrier is completely cancelled.

3. Apparatus for receiving and descrambling a TV signal having AM sinewave modulation impressed upon the picture carrier and the sound carrier for scrambling said TV signal, said apparatus comprising:

means for receiving a scrambled TV signal having an AM sinewave modulated on the picture carrier and sound carrier for scrambling the video portion of the TV signal;

first loop means for detecting the AM sinewave from the received TV signal and applying the AM sinewave to the video portion of the received TV signal to cancel the AM modulation impressed thereon; and second loop means for applying the detected AM sinewave from the received TV signal to an audio portion of the received TV signal.

4. Apparatus according to claim 3, wherein:

the first loop includes a first modulator receiving the scrambled TV signal providing an output through a sound bandpass filter to a second modulator, the second modulator providing an output to an AM receiver, the AM receiver providing an output through bandpass filters at $f_H$ and $2f_H$ to a summing amplifier, the summing amplifier providing an output as an input to the first modulator; and the second loop includes the second modulator, the AM receiver, the bandpass filters and the summing amplifier of the first loop, and further includes an inverting amplifier receiving the output of the summing amplifier and providing an output as an input to the second modulator.

* * * * *